(12) United States Patent
Prakah-Asante et al.

(10) Patent No.: US 9,845,097 B2
(45) Date of Patent: Dec. 19, 2017

(54) DRIVER ATTENTION EVALUATION

(71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/824,465

(22) Filed: Aug. 12, 2015

(65) Prior Publication Data

US 2017/0043781 A1 Feb. 16, 2017

(51) Int. Cl.
*B60K 28/02* (2006.01)
*B60W 40/08* (2012.01)

(52) U.S. Cl.
CPC .................................. *B60W 40/08* (2013.01)

(58) Field of Classification Search
CPC ...... B60K 28/02; B60K 28/06; B80K 28/066; G06K 9/00845
USPC .................................. 340/438, 576
See application file for complete search history.

(56) References Cited

U.S. PATENT DOCUMENTS

| | | | |
|---|---|---|---|
| 4,797,671 A | 1/1989 | Toal, Jr. | |
| 4,804,937 A | 2/1989 | Barbiaux | |
| 5,355,511 A | 10/1994 | Hatano et al. | |
| 5,432,841 A | 7/1995 | Rimer | |
| 5,633,484 A | 5/1997 | Zancho et al. | |
| 5,654,686 A | 8/1997 | Geschke et al. | |
| 5,732,074 A | 3/1998 | Spaur et al. | |
| 5,758,300 A | 5/1998 | Abe | |
| 5,889,468 A | 3/1999 | Banga | |
| 5,942,979 A | 8/1999 | Luppino | |
| 5,943,206 A | 8/1999 | Crayford | |
| 5,963,129 A | 10/1999 | Warner | |
| 5,986,543 A | 11/1999 | Johnson | |
| 5,993,397 A | 11/1999 | Branson | |
| 6,025,777 A | 2/2000 | Fuller et al. | |
| 6,037,676 A | 3/2000 | Foree | |
| 6,067,009 A | 5/2000 | Hozuka et al. | |
| 6,104,931 A | 8/2000 | Havinis et al. | |
| 6,292,095 B1 | 9/2001 | Fuller et al. | |

(Continued)

FOREIGN PATENT DOCUMENTS

DE  10141439  2/2003
DE  10225787  12/2003
(Continued)

OTHER PUBLICATIONS

J. Smith, Wanted: One Gorilla, printed from www.tirereview.com, Jul. 27, 2009, pp. 1-4.

(Continued)

*Primary Examiner* — Kevin Kim
(74) *Attorney, Agent, or Firm* — Frank A. MacKenzie; Brooks Kushman P.C.

(57) ABSTRACT

A driver evaluation system for a vehicle generates for display a parameter indicative of a driver's level of attention to driving the vehicle for a temporal period based on a complement of a weighted average of a plurality of counts. Some of the counts represent a number of interaction events between the driver and an infotainment system in the vehicle during the temporal period.

17 Claims, 4 Drawing Sheets

(56) References Cited

U.S. PATENT DOCUMENTS

| | | |
|---|---|---|
| 6,295,449 B1 | 9/2001 | Westerlage et al. |
| 6,339,736 B1 | 1/2002 | Moskowitz et al. |
| 6,343,220 B1 | 1/2002 | Van Der Salm |
| 6,370,472 B1 | 4/2002 | Fosseen |
| 6,377,890 B1 | 4/2002 | Doi |
| 6,415,210 B2 | 7/2002 | Hozuka et al. |
| 6,429,773 B1 | 8/2002 | Schuyler |
| 6,435,018 B1 | 8/2002 | Murakami et al. |
| 6,441,732 B1 | 8/2002 | Laitsaari et al. |
| 6,470,732 B1 | 10/2002 | Breton |
| 6,487,478 B1 | 11/2002 | Azzaro et al. |
| 6,525,643 B1 | 2/2003 | Okada et al. |
| 6,571,617 B2 | 6/2003 | Van Niekerk et al. |
| 6,587,040 B2 | 7/2003 | Seto |
| 6,611,740 B2 | 8/2003 | Lowrey et al. |
| 6,612,165 B2 | 9/2003 | Juzswik et al. |
| 6,629,031 B2 | 9/2003 | Gustavsson et al. |
| 6,671,609 B2 | 12/2003 | Nantz et al. |
| 6,691,025 B2 | 2/2004 | Reimer |
| 6,732,031 B1 | 5/2004 | Lightner et al. |
| 6,738,697 B2 | 5/2004 | Breed |
| 6,825,758 B1 | 11/2004 | Laitsaari |
| 6,836,708 B2 | 12/2004 | Tripathi |
| 6,839,614 B1 | 1/2005 | Timko et al. |
| 6,845,314 B2 | 1/2005 | Fosseen |
| 6,847,872 B2 | 1/2005 | Bodin et al. |
| 6,853,853 B1 | 2/2005 | Van Wiemeersch et al. |
| 6,868,358 B2 | 3/2005 | Brown |
| 6,892,052 B2 | 5/2005 | Kotola et al. |
| 6,892,116 B2 | 5/2005 | Geisler et al. |
| 6,930,614 B2 | 8/2005 | Rackham et al. |
| 6,937,141 B2 | 8/2005 | Muramatsu |
| 6,983,200 B2 | 1/2006 | Bodin et al. |
| 6,993,421 B2 | 1/2006 | Pillar et al. |
| 7,040,154 B2 | 5/2006 | Shaw et al. |
| 7,053,761 B2 | 5/2006 | Schofield et al. |
| 7,068,158 B2 | 6/2006 | Komatsu et al. |
| 7,092,804 B2 | 8/2006 | McQuade et al. |
| 7,096,101 B2 | 8/2006 | Sonnenrein et al. |
| 7,114,379 B2 | 10/2006 | Emord |
| 7,170,400 B2 | 1/2007 | Cowelchuk et al. |
| 7,171,188 B1 | 1/2007 | Watanabe et al. |
| 7,216,532 B2 | 5/2007 | Rimkus et al. |
| 7,218,209 B2 | 5/2007 | Utter et al. |
| 7,219,063 B2 | 5/2007 | Schalk et al. |
| 7,224,262 B2 | 5/2007 | Simon et al. |
| 7,228,122 B2 | 6/2007 | Oyagi et al. |
| 7,319,378 B1 | 1/2008 | Thompson et al. |
| 7,379,541 B2 | 5/2008 | Iggulden et al. |
| 7,394,352 B2 | 7/2008 | Bell et al. |
| 7,403,124 B2 | 7/2008 | Arakawa et al. |
| 7,509,849 B2 | 3/2009 | Rutherford et al. |
| 7,532,958 B2 | 5/2009 | Powers et al. |
| 7,778,186 B2 | 8/2010 | Oman et al. |
| 7,783,246 B2 | 8/2010 | Twitchell, Jr. et al. |
| 7,849,149 B2 | 12/2010 | Habaguchi et al. |
| 7,859,392 B2 | 12/2010 | McClellan et al. |
| 8,061,879 B2 | 11/2011 | Simmons et al. |
| 8,089,348 B2 | 1/2012 | Kameyama |
| 8,120,475 B2 | 2/2012 | Iwamoto et al. |
| 8,325,028 B2 | 12/2012 | Schofield et al. |
| 8,344,866 B2 | 1/2013 | Lermer et al. |
| 8,522,320 B2 | 8/2013 | Kleve et al. |
| 8,981,942 B2 | 3/2015 | He et al. |
| 2001/0033225 A1 | 10/2001 | Razavi et al. |
| 2002/0130771 A1 | 9/2002 | Osborne et al. |
| 2003/0004741 A1 | 1/2003 | Johnson et al. |
| 2003/0016130 A1 | 1/2003 | Joao |
| 2003/0093218 A1 | 5/2003 | Jones |
| 2003/0158640 A1 | 8/2003 | Weber |
| 2003/0205081 A1 | 11/2003 | Proschka |
| 2003/0208309 A1 | 11/2003 | Tripathi |
| 2004/0050188 A1 | 3/2004 | Richards et al. |
| 2004/0075539 A1 | 4/2004 | Savoie et al. |
| 2004/0112124 A1 | 6/2004 | Sonnenrein et al. |
| 2004/0193368 A1 | 9/2004 | Sanqunetti |
| 2004/0203634 A1 | 10/2004 | Wang et al. |
| 2005/0024189 A1 | 2/2005 | Weber |
| 2005/0137763 A1 | 6/2005 | Watkins et al. |
| 2005/0179518 A1 | 8/2005 | Kawamura |
| 2005/0190900 A1 | 9/2005 | White et al. |
| 2005/0195106 A1 | 9/2005 | Davis et al. |
| 2005/0273218 A1 | 12/2005 | Breed et al. |
| 2006/0095174 A1 | 5/2006 | Sonnenrein et al. |
| 2006/0208865 A1 | 9/2006 | Quach et al. |
| 2006/0220806 A1 | 10/2006 | Nguyen |
| 2006/0220809 A1 | 10/2006 | Stigall et al. |
| 2006/0220813 A1 | 10/2006 | Utter et al. |
| 2006/0235652 A1 | 10/2006 | Rimkus et al. |
| 2006/0273885 A1 | 12/2006 | Thompson |
| 2006/0288101 A1 | 12/2006 | Mastrodonato et al. |
| 2007/0013498 A1 | 1/2007 | Knoll et al. |
| 2007/0015548 A1 | 1/2007 | Flick |
| 2007/0027595 A1 | 2/2007 | Nou |
| 2007/0060056 A1 | 3/2007 | Whitaker et al. |
| 2007/0069951 A1 | 3/2007 | Sweet |
| 2007/0155300 A1 | 7/2007 | Hsieh |
| 2007/0156317 A1 | 7/2007 | Breed |
| 2007/0193348 A1 | 8/2007 | Rutherford et al. |
| 2007/0200671 A1 | 8/2007 | Kelley et al. |
| 2007/0229350 A1 | 10/2007 | Scalisi et al. |
| 2007/0290881 A1 | 12/2007 | Nikitin et al. |
| 2008/0005055 A1* | 1/2008 | Horvitz .......... G06Q 10/04 706/62 |
| 2008/0024285 A1 | 1/2008 | Vandenbrink et al. |
| 2008/0046149 A1 | 2/2008 | Breed |
| 2008/0077292 A1 | 3/2008 | Gisler |
| 2008/0082221 A1 | 4/2008 | Nagy |
| 2008/0106859 A1 | 5/2008 | Eguchi et al. |
| 2008/0125665 A1 | 5/2008 | Nigam |
| 2008/0136611 A1 | 6/2008 | Benco et al. |
| 2008/0140265 A1 | 6/2008 | Hong et al. |
| 2008/0147265 A1 | 6/2008 | Breed |
| 2008/0147271 A1 | 6/2008 | Breed |
| 2008/0172147 A1 | 7/2008 | Taki et al. |
| 2008/0197970 A1 | 8/2008 | Fouts |
| 2008/0204556 A1 | 8/2008 | De Miranda et al. |
| 2008/0215665 A1 | 9/2008 | Appleby et al. |
| 2008/0228355 A1 | 9/2008 | De Jonk et al. |
| 2008/0266051 A1 | 10/2008 | Taki et al. |
| 2008/0299961 A1 | 12/2008 | Muller et al. |
| 2008/0309451 A1 | 12/2008 | Zellweger et al. |
| 2009/0075624 A1 | 3/2009 | Cox et al. |
| 2009/0091437 A1 | 4/2009 | Corniot |
| 2009/0096575 A1 | 4/2009 | Tieman |
| 2009/0096576 A1 | 4/2009 | Oman et al. |
| 2009/0096596 A1 | 4/2009 | Sultan et al. |
| 2009/0098907 A1 | 4/2009 | Huntzicker et al. |
| 2009/0167524 A1 | 7/2009 | Chesnutt et al. |
| 2009/0273438 A1 | 11/2009 | Sultan et al. |
| 2009/0273687 A1* | 11/2009 | Tsukizawa .......... G06F 3/012 348/222.1 |
| 2010/0033333 A1* | 2/2010 | Victor .............. A61B 3/113 340/576 |
| 2010/0145759 A1 | 6/2010 | Hembury |
| 2010/0168967 A1 | 7/2010 | Dlugoss et al. |
| 2010/0233957 A1 | 9/2010 | Dobosz |
| 2011/0015971 A1 | 1/2011 | Hembury |
| 2011/0029875 A1 | 2/2011 | Milch |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0080282 A1 | 4/2011 | Kleve et al. |
| 2011/0130945 A1 | 6/2011 | Deedy et al. |
| 2011/0205040 A1 | 8/2011 | Van Wiemeersch |
| 2011/0205047 A1 | 8/2011 | Patel et al. |
| 2011/0215901 A1 | 9/2011 | Van Wiemeersch et al. |
| 2011/0230165 A1 | 9/2011 | Kleve et al. |
| 2011/0254692 A1 | 10/2011 | Furuta |
| 2012/0313768 A1 | 12/2012 | Campbell et al. |
| 2013/0151027 A1 | 6/2013 | Petrucci et al. |
| 2014/0214313 A1 | 7/2014 | Lorenz |

(56) References Cited

U.S. PATENT DOCUMENTS

FOREIGN PATENT DOCUMENTS

| | | |
|---|---|---|
| JP | 2005220635 | 8/2005 |
| WO | 2006075533 | 7/2006 |

OTHER PUBLICATIONS

Check Tire Pressure with Bluetooth, printed from www.esato.com, Jul. 30, 2004, pp. 1-2.
Acumine Pty Ltd—Fleet Monitoring System, http://www.acumine.com/_Products/Fleet Monitoring.php., May 22, 2009, pp. 1-3.
Vehicle monitoring system, GPS vehicle monitoring system. Vehicle tracking system. http://www.guardmagic.com/, May 22, 2009, pp. 1-2.
911 Assist, Vehicle Health Report Expand Sync Capabilities and Convenience Features, printout from www.media.ford.com, May 21, 2009, pp. 1-2.
Vehicle Health Report Delivers Assistance With Vehicle Maintenance and Monitoring, printout from www.media.ford.com, Jun. 2008, pp. 1-1.
Solindo GPS, Solindo Web Products: The Solutions Provider Company. Printout from www.solindoweb.com/products. php on Sep. 16, 2009, pp. 1-4.
Deliverable D61.1 Final Report, Highly Automated Vehicles for Intelligent Transport (HAVEit), Sep. 23, 2011, pp. 1-358.

\* cited by examiner

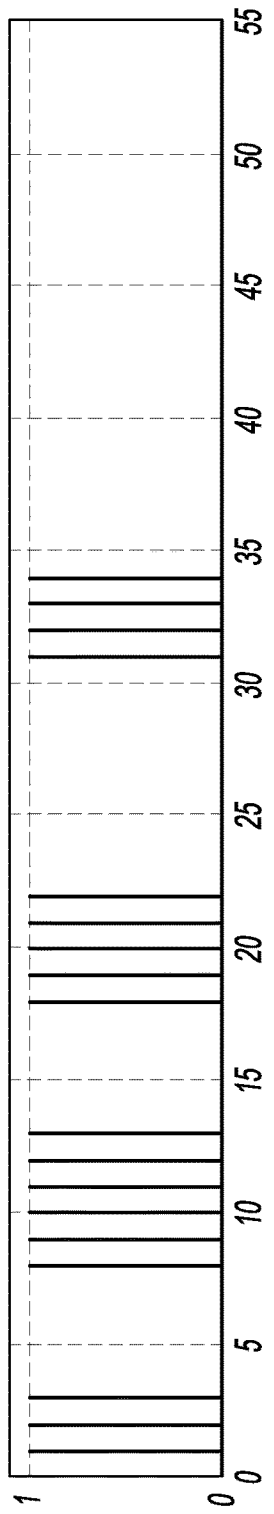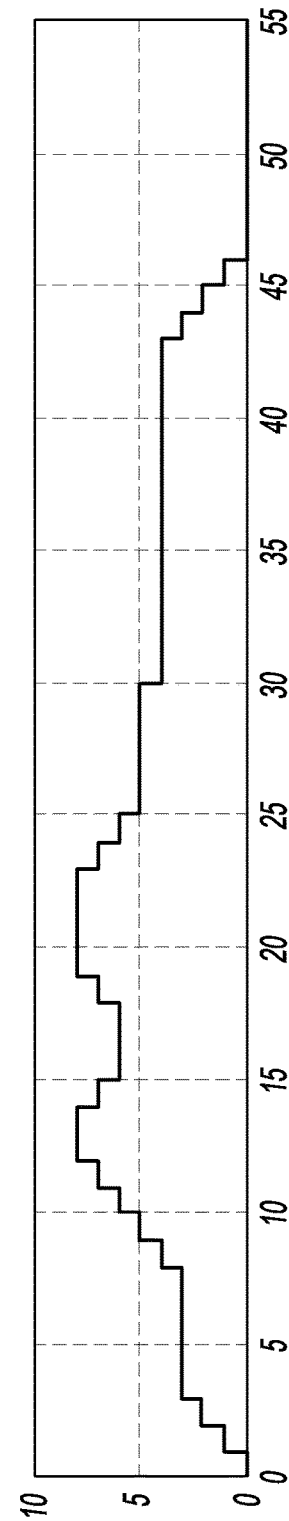
Fig-2A
Fig-2B

DRIVER ATTENTION EVALUATION

TECHNICAL FIELD

This disclosure relates to systems and methods for evaluating a driver's focus on the task of driving.

BACKGROUND

Sophisticated automobile electronic devices can provide an array of features and functions with which the driver can interact. Moreover, the number of available portable computing and telecommunication devices, such as cell phones, tablets and wearable devices is increasing. As a result, these portable devices are more likely to be present in the vehicle. Overuse of these electronic and portable devices while driving may draw the attention of the driver away from the road.

SUMMARY

A driver evaluation system for a vehicle includes one or more controllers programmed to generate for display a parameter indicative of a driver's level of attention to driving the vehicle for a temporal period based on a complement of a weighted average of a plurality of counts. At least some of the counts represent a number of interaction events between the driver and an infotainment system in the vehicle during the temporal period. The one or more controllers may further be programmed to link the parameter with geographic coordinates traversed by the vehicle during the temporal period, and in response to a driver attention request including the geographic coordinates, output the parameter. The one or more controllers may further be programmed to accumulate one of the counts such that, in response to occurrence of an interaction event, the one of the counts being greater than zero, and a count timer exceeding a predefined time limit, the count timer is decreased according to a difference between the count timer and a quotient of the predefined time limit and the one of the counts. The temporal period may be defined by a sliding window time period. The one or more controllers may further be programmed to record a value of the parameter for each of temporal periods defining a drive cycle. At least one of the plurality of counts may represent a number of look-away events from a road during the temporal period. The look-away events may be based on an eye gaze direction or head pose of the driver. The infotainment system may be a cell phone, an instrument panel cluster, or a center stack console.

A driver evaluation method includes, by a controller, accumulating a driver inattention event count such that, in response to occurrence of an interaction event and a count timer exceeding a limit, the count timer is decreased according to a difference between the count timer and a quotient of the limit and the count. The method also includes displaying a driver attention state value that is based on a complement of a weighted average that includes the count. The method may further include linking the driver attention state value with geographic coordinates, and in response to a driver attention request including the geographic coordinates, outputting the driver attention state value. The method may further include recording the driver attention state value for each of a plurality of temporal periods defining a drive cycle, and upon completion of the drive cycle, displaying an average of at least some of the driver attention state values. The method may further include wirelessly transmitting the driver attention state value off-board. The driver inattention event count may represent a number of look-away events from a road for a temporal period. The look-away events may be based on an eye gaze direction or head pose of a driver.

A vehicle includes an interface, and one or more controllers programmed to, in response to a driver attention request, generate for display via the interface a parameter indicative of a driver's level of attention to driving the vehicle for a selected time period based on a complement of a weighted average, having a value between zero and one, of a plurality of counts. At least some of the counts represent a number of interaction events between the driver and an infotainment system in the vehicle during the selected time period. The one or more controllers may further be programmed to accumulate one of the counts such that, in response to occurrence of an interaction event, the one of the counts being greater than zero, and a value of a count timer exceeding a predefined time limit, the value is decreased according to a difference between the count timer and a quotient of the predefined time limit and the one of the counts. The selected time period may define a drive cycle. At least one of the plurality of counts may represent a number of look-away events from a road during the selected time period. The look-away events may be based on an eye gaze direction or head pose of the driver.

BRIEF DESCRIPTION OF THE DRAWINGS

FIGS. 2A and 2B are plots showing, respectively, driver inattention events over time and a corresponding count of the same for a sliding window time period.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Drivers have access to a variety of in-vehicle infotainment systems such as center stack consoles, clusters, mobile phones, wearable devices, etc. Extended use of these devices during periods of driving may reduce driver focus and attention. Although various systems may provide alerts or postpone information delivery based on the extent to which a driver is interacting with infotainment devices, it may further be useful to provide a gauge of overall driver attentiveness. That is, it may be useful to represent the driver's level of attention to the driving task for a given time period (e.g., a drive cycle, a selected portion of a drive cycle, etc.) as a function of their aggregate interaction with available devices during that time period: high interaction would suggest low driver attentiveness to the driving task, low interaction would suggest high driver attentiveness to the driving task. Numeric values, symbols, icons, etc. can be used to convey the driver's level of attention.

Figure 1:
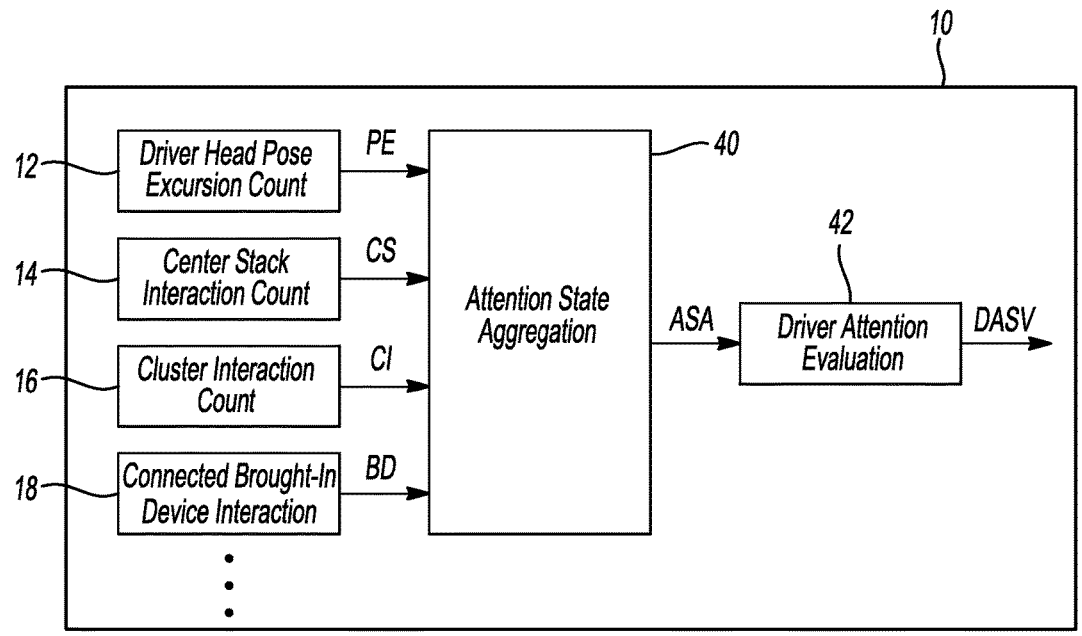
FIG. 1 is a block diagram of a driver attention evaluation system.

Referring to FIG. 1, one or more processors 10 may implement a set of algorithms structured to generate a parameter representing the driver's level of attention to the driving task. To begin, data concerning driver head pose excursions, center stack interaction, cluster interaction, connected brought-in device interaction, etc. is collected via respective counting algorithms 12, 14, 16, 18. As an example, in-vehicle cameras may be used to track a direction of the driver's eye gaze or head pose using known techniques. If the gaze or pose is evaluated as being away from the road for at least some predetermined period of time (using, for example, known recursive signal processing techniques to determine look-away glances longer than the predetermined period of time), an accumulator value, PE, may be incremented. Likewise if signals from a center stack console, instrument panel cluster, a brought-in device in communication with the vehicle, etc. indicate that a driver is engaged therewith, respective accumulator values, CS, Cl, BD, may be incremented.

Any number of techniques may be used to track the level of interaction with the above mentioned subsystems and devices. For example, FIG. 2A shows a number of interactions with a given infotainment device over a 55 second time period. A value of 1 indicates an interaction event, such as touching a screen, turning a dial, dialing a cell phone, etc. And, a value of 0 indicates the absence of an interaction event. FIG. 2B shows a corresponding circular buffer count with a 12 second moving window. While the counting result from the circular buffer is the true accumulated count for the moving 12 second window, a 50 Hz sampling rate will require 600 data storage memory allocations.

Figure 3:
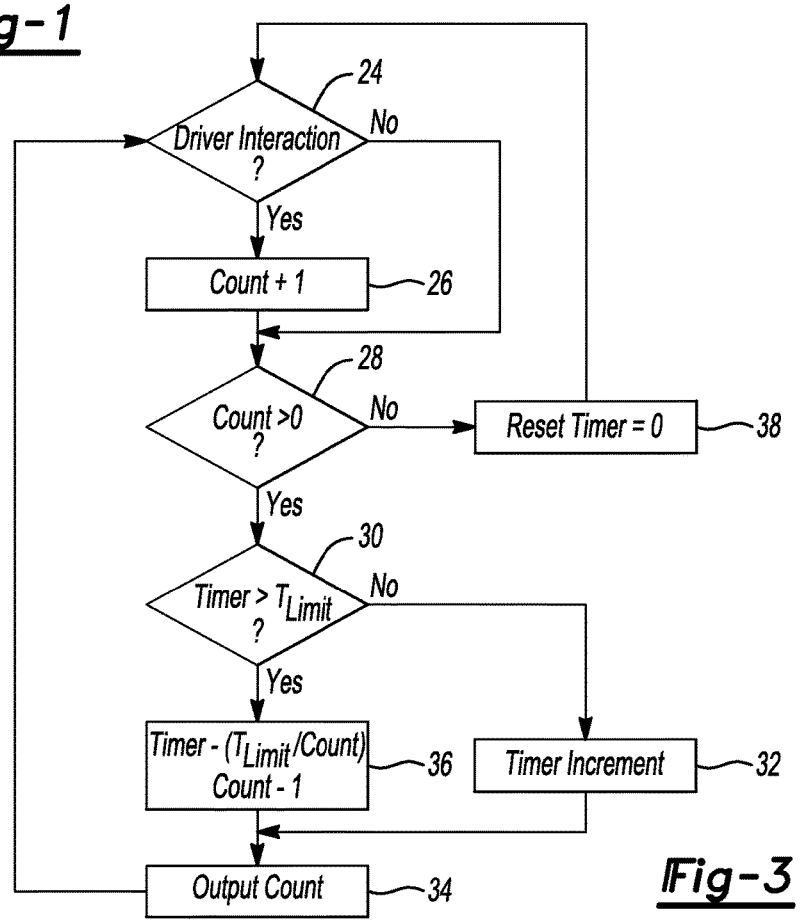
FIG. 3 is a block diagram of an algorithm for counting driver inattention events.

Referring to FIG. 3, an alternative counting algorithm may be used that only requires two fixed size registers: one for the count and one for a count timer. If an interaction event is detected at decision block 24, the count is incremented at operation 26. If the count is greater than 0 at decision block 28, the algorithm proceeds to decision block 30. If the count timer is less than a predefined time limit, the count timer is incremented at operation 32. The count is then output at operation 34. The algorithm then returns to decision block 24.

Thus upon system initialization, the count timer remains at 0 until occurrence of a first interaction event—at which time the count timer begins to increase in value up to the predefined time limit. The predefined time limit effectively dictates the rate at which the count will decay absent further interaction events: the smaller the limit, the faster the decay; the larger the limit, the slower the decay. Hence, the limit can be selected or tuned to achieve a desired decay for a particular infotainment device. For example, the limit may be selected such that the count for interactions with a mobile device decay more slowly as compared with interactions with a radio volume dial because interactions with the mobile device may be more distracting than interactions with the radio volume dial, etc.

Returning to decision block 30, if the timer is greater than the limit, the timer, at operation 32 is reduced by a fraction of its value according to the difference between the timer and the quotient of the limit and the count. Additionally, the counter is decremented. The algorithm then proceeds to operation 34.

Once the count timer exceeds the limit, the value of the count no longer increases because any increment to the count that took place at operation 26 is then removed at operation 36. Put a different way, once the count timer exceeds the limit, the value of the count will either remain the same (in the presence of interaction events) or decrease in value.

Returning to decision block 28, if the count is equal to 0, the timer is reset to 0. The algorithm then returns to decision block 24.

Figure 4A:
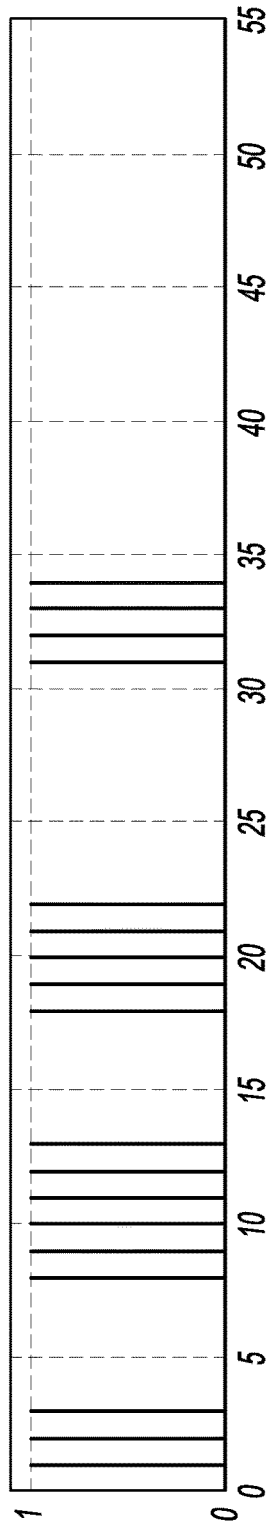
FIGS. 4A and 4B are plots showing, respectively, driver inattention events over time and a corresponding count of the same using the algorithm of FIG. 3.
Figure 4B:
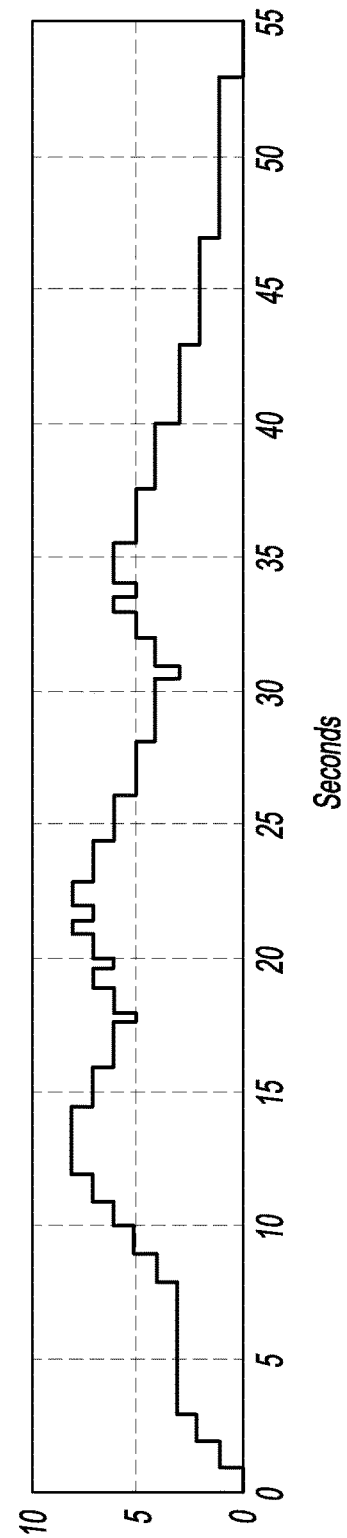

FIG. 4A again shows the number of interactions with the given infotainment device over a 55 second time period. (The same number of interactions with the same frequency as FIG. 2A.) FIG. 4B shows a corresponding count using the memory efficient algorithm of FIG. 3. Comparing FIGS. 2B and 4B, the memory efficient algorithm approximates the count with a fair degree of accuracy, but with much less overhead.

Referring again to FIG. 1, the respective counts PE, CS, Cl and BD are provided to an attention state aggregation algorithm 40. In one example, the respective counts are summed using a weighted average to generate an attention state aggregation value, ASA, according to the equation $$ASA = \sum_{i=1}^{N} w_i y_i \qquad \text{Eq. (1)}$$

where N is the number of driver interaction devices tracked, $y_i$ is the interaction device accumulated incidents, and $w_i$ is the weight attributed to each device verifiable dependent element. The weights may be selected such that any resulting ASA has a value between 0 and 1. And, the weights may be selected to take into account that certain interactions may be more distracting than others: dialing a brought-in device (such as a cell phone) may be more distracting than turning a dial on a cluster. Hence in certain embodiments, the rates at which the counts decay and the weights associated with the counts may be different to reflect that certain types of interactions are more taxing than others.

Using the inputs PE, CS, Cl and BD, the ASA would be given by $$ASA = PE w_{PE} + CS w_{CS} + Cl w_{Cl} + BD w_{BD} \qquad \text{Eq. (2)}$$

Any suitable aggregating technique, however, may be used.

The ASA is then provided to a driver attention state evaluation algorithm 42. In one example, the driver attention state value, DASV, may be computed as the complement of the ASA according to the equation $$DASV = 1 - ASA \qquad \text{Eq. (3)}$$

Hence, the DASV provides a value between 0 and 1 that may be scaled as a percentile and binned into different categories to reflect driver attention for a given time period. Values in the range of 80% to 100% can represent high driver attention to the driving task, whereas values in the range of 0% to 20% can represent low driver attention to the driving task.

The respective counts discussed above can be sampled at selected or periodic times, and equations (2) and (3) used to generate a DASV for that period. These DASV can then be, for example, averaged to develop a DASV for a given drive cycle, or, for example, linked with various geographic portions of a drive cycle such that the driver's attention for a city driving portion or highway portion of the drive cycle can be evaluated. As an example, a DASV can be generated every minute, and each DASV can be associated with current geographic coordinates of the vehicle for that time. A user may then request the DASV for a particular portion of a drive cycle via a request for the DASV associated with geographic coordinates defined by the particular portion of the drive cycle. Values for the DASV or an average thereof may then be reported. Other scenarios are also contemplated.

Figure 5:
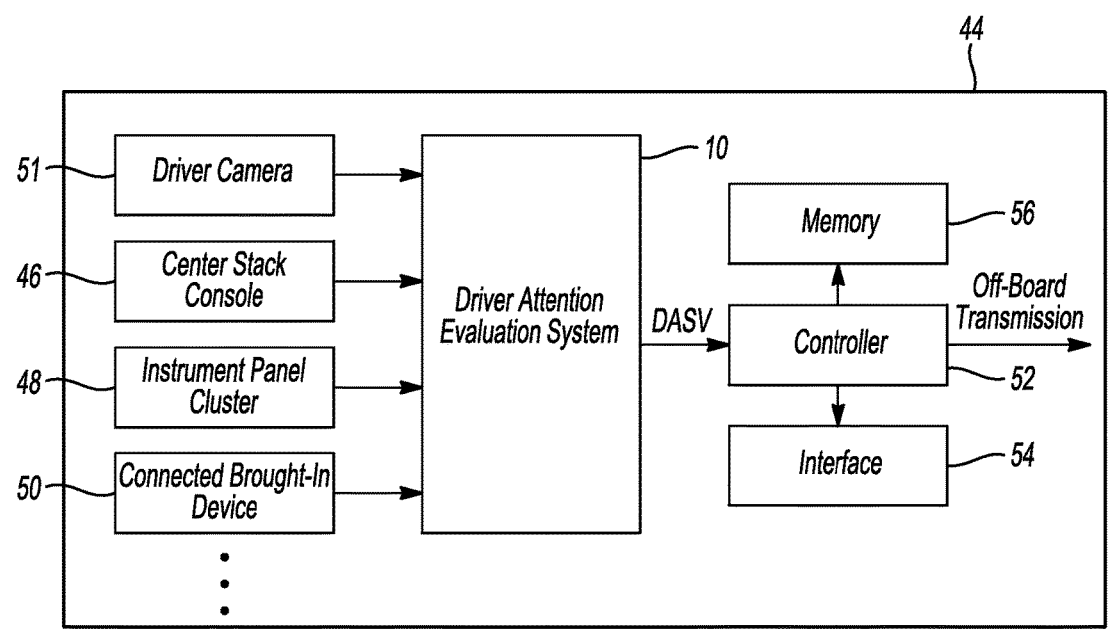
FIG. 5 is a block diagram of a vehicle including the driver attention evaluation system of FIG. 1.

Referring to FIG. 5, a vehicle 44 includes a plurality of sub-systems or devices that a driver may interact with such as a center stack console 46 and an instrument panel cluster 48. A driver may also have brought into the vehicle 44 a device 50, such as a cell phone or wearable device, that is in communication with various controllers and communication infrastructure of the vehicle 44 using known techniques. Still further, the vehicle 44 may include a camera system 51 configured as known in the art to track head movements or eye gaze directions of the driver. Data indicating whether the driver is interacting with any of the center stack console 46, the instrument panel cluster 48 or brought-in device 50 may be provided to the driver attention evaluation system 10 via a car area network or other communication lines therebetween. Likewise, data representing the driver's head pose or direction of eye gaze may be provided to the driver attention evaluation system 10. Using the algorithms described above, the processors of the driver attention evaluation system 10 may generate DASV from the data provided.

The DASV may be passed to a controller 52, which may selectively provide the DASV to an interface 54 for display, to a memory 56 for later retrieval, or to a transmitter (or otherwise) for off-board transmission.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A driver evaluation system for a vehicle comprising:
a controller programmed to generate for display a parameter indicative of a driver's level of attention to driving the vehicle for a sliding window time period based on a complement of a weighted average of a plurality of counts at least some of which represent a number of interaction events between the driver and an infotainment system in the vehicle during the time period.

2. The system of claim 1, wherein the controller is further programmed to link the parameter with geographic coordinates traversed by the vehicle during the time period, and in response to a driver attention request including the geographic coordinates, output the parameter.

3. The system of claim 1, wherein the controller is further programmed to accumulate one of the counts such that, in response to occurrence of an interaction event, the one of the counts being greater than zero, and a count timer exceeding a predefined time limit, the count timer is decreased according to a difference between the count timer and a quotient of the predefined time limit and the one of the counts.

4. The system of claim 1, wherein the controller is further programmed to record a value of the parameter for time periods defining a drive cycle.

5. The system of claim 1, wherein at least one of the counts represents a number of look-away events from a road during the time period.

6. The system of claim 5, wherein the look-away events are based on an eye gaze direction or head pose of the driver.

7. The system of claim 1, wherein the infotainment system is a cell phone, an instrument panel cluster, or a center stack console.

8. A driver evaluation method comprising:
by a controller,
accumulating a driver inattention event count such that, in response to occurrence of an inattention event and a count timer exceeding a limit, the count timer is decreased according to a difference between the count timer and a quotient of the limit and the count, and
displaying a driver attention state value that is based on a complement of a weighted average that includes the count.

9. The method of claim 8 further comprising linking the driver attention state value with geographic coordinates, and in response to a driver attention request including the geographic coordinates, outputting the driver attention state value.

10. The method of claim 8 further comprising recording the driver attention state value for each of a plurality of time periods defining a drive cycle, and upon completion of the drive cycle, displaying an average of at least some of the driver attention state values.

11. The method of claim 8 further comprising wirelessly transmitting the driver attention state value off-board.

12. The method of claim 8, wherein the driver inattention event count represents a number of look-away events from a road for a time period.

13. The method of claim 12, wherein the look-away events are based on an eye gaze direction or head pose of a driver.

14. A vehicle comprising:
an interface; and
one or more controllers programmed to,
- in response to a driver attention request, generate for display via the interface a parameter indicative of a driver's level of attention to driving the vehicle for a selected time period based on a complement of a weighted average, having a value between zero and one, of a plurality of counts at least some of which represent a number of interaction events between the driver and an infotainment system in the vehicle during the selected time period, and
- accumulate one of the counts such that, in response to occurrence of an interaction event, the one of the counts being greater than zero, and a value of a count timer exceeding a predefined time limit, the value is decreased according to a difference between the count timer and a quotient of the predefined time limit and the one of the counts.

15. The vehicle of claim 14, wherein the selected time period defines a drive cycle.

16. The vehicle of claim 14, wherein at least one of the counts represents a number of look-away events from a road during the selected time period.

17. The vehicle of claim 16, wherein the look-away events are based on an eye gaze direction or head pose of the driver.

* * * * *